United States Patent
Sone et al.

(10) Patent No.: US 8,200,088 B2
(45) Date of Patent: Jun. 12, 2012

(54) OPTICAL COMMUNICATION SYSTEM, AND OPTICAL COMMUNICATION METHOD AND COMMUNICATION UNIT THEREFOR

(75) Inventors: Kyosuke Sone, Kawasaki (JP); Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 12/474,683

(22) Filed: May 29, 2009

(65) Prior Publication Data

US 2009/0252492 A1    Oct. 8, 2009

Related U.S. Application Data

(63) Continuation of application No. PCT/JP2006/325105, filed on Dec. 15, 2006.

(51) Int. Cl.
*H04J 14/00*    (2006.01)
(52) U.S. Cl. ............................................. 398/72; 398/66
(58) Field of Classification Search .................... 398/66, 398/70–72
See application file for complete search history.

(56) References Cited

U.S. PATENT DOCUMENTS

| | | | |
|---|---|---|---|
| 5,760,935 A * | 6/1998 | Sabry et al. ...................... | 398/75 |
| 6,470,032 B2 * | 10/2002 | Dudziak et al. ................ | 370/503 |
| 7,289,439 B2 | 10/2007 | Lee et al. | |
| 7,706,688 B2 * | 4/2010 | Boudreault et al. ............ | 398/59 |
| 2003/0133460 A1 | 7/2003 | Lee et al. | |
| 2004/0101302 A1 | 5/2004 | Kim et al. | |
| 2006/0140631 A1 | 6/2006 | Brolin | |
| 2007/0280691 A1 * | 12/2007 | Bouda ............................. | 398/71 |
| 2008/0069564 A1 * | 3/2008 | Bernard ........................ | 398/72 |
| 2011/0164882 A1 * | 7/2011 | Ye et al. ........................ | 398/141 |

FOREIGN PATENT DOCUMENTS

| | | |
|---|---|---|
| JP | 2003-244178 | 8/2003 |
| WO | 03/067919 A1 | 8/2003 |
| WO | 2006/094960 A1 | 9/2006 |

OTHER PUBLICATIONS

H. Endo, et al., "The bandwidth management on the G-PON system and the multiplexer", IEICE Technical Report, CS2006-13, Apr. 2006.
A. Fujii, et al., "IP optical traffic engineering multi-layer network-technology for avoiding node bottlenecks in exploding networks", Oki Technical Review, No. 197, vol. 71, No. 1, Jan. 2004.
H. Kojima, et al., "A study of optical pass-through method considering IP routing domains", IEICE Technical Report, NS2005-22, Apr. 2005.
International Search Report mailed Feb. 13, 2007 for corresponding International Application No. PCT/JP2006/325105.
European Search Report dated Jan. 27, 2012 issued in corresponding European Patent Application No. 06834832.5.
Masatoshi Suzuki et al., "Next Generation Optical Network for all-IP Fixed and Wireless Broadband Services", Proceedings of the 2006 International Conference on Transparent Optical Networks, Jun. 2006, pp. 238-241.

* cited by examiner

*Primary Examiner* — Nathan Curs
(74) *Attorney, Agent, or Firm* — Staas & Halsey LLP

(57) ABSTRACT

A communication unit inhibits delay and jitter during network communication, improving the communication quality. For this purpose, the communication unit includes: a first terminator that terminates a communication channel in the first optical communication scheme established between the communication unit and another communication unit; a second terminator that terminates a signal in the second optical communication scheme; and a path setting switch that switches between a first signal path setting and a second signal path setting.

10 Claims, 9 Drawing Sheets

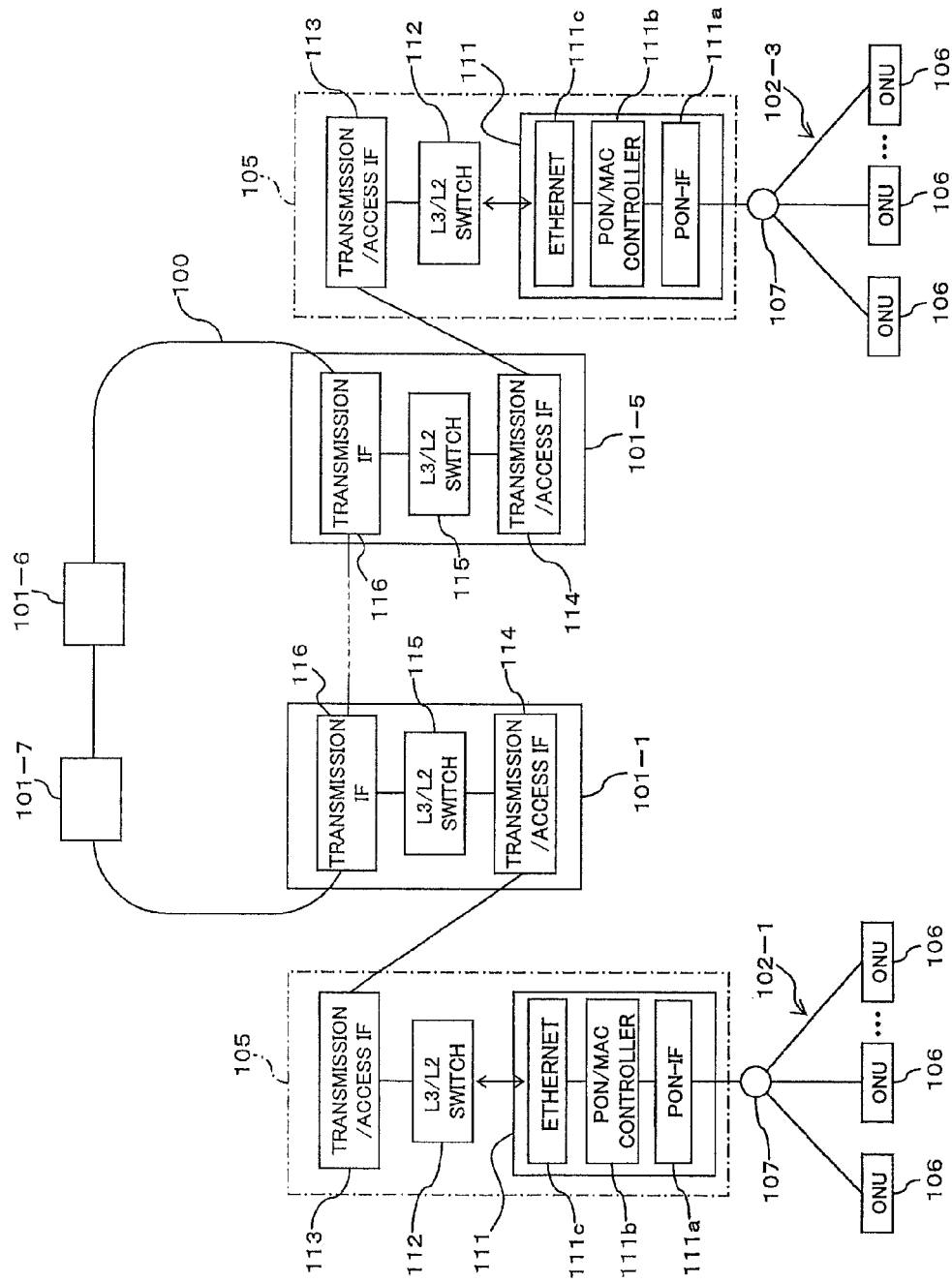

OPTICAL COMMUNICATION SYSTEM, AND OPTICAL COMMUNICATION METHOD AND COMMUNICATION UNIT THEREFOR

CROSS REFERENCE TO RELATED APPLICATION(S)

This application is a continuation application of a PCT international application No. PCT/JP2006/325105 filed on Dec. 15, 2006 in Japan, the entire contents of which are incorporated by reference.

TECHNICAL FIELD

The present invention relates to an optical communication system, and an optical communication method and a communication unit therefor, and is particularly directed to a technique preferably applied to an optical access network in which high-speed optical signal with reduced delay and jitter are transmitted to subscribers.

BACKGROUND

In accordance with recent spreading of Internet, enhancements in speed and economy of communication system have become an important issue, and a PON (Passive Optical Network) has been applied to an accessing network. A typical PON connects a single Optical Line Termination (OLT) to a number of Optical Network Units (ONUs) by the use of a "1×N" passive optical splitter and thereby forms a distributed topology in a tree structure.

Following an increase in a bandwidth required for a subscriber network in conjunction with improvement of Internet technology, there has been proposed a communication method in a GE (Gigabit Ethernet: trademark)-PON of a point to multi points (see Patent Reference 1 below). It seems that the performance of a PON, in regard of the capacity and the transmission distance, will be further improved in future. In due course, a PON system will require a wide variety of services, probably increasing services that are sensitive to delay and jitter.

FIG. 7 depicts, as an example of application of a PON to an actual system, a network system in which each of node units that form a metro ring accommodates a PON. Here, a metro ring 100 is formed of a number (seven in the drawing) of node units 101-1 through 101-7, and the node units 101-1 to 101-3, and 101-5 accommodate PONs 102-1, 102-2, 102-4, and 102-3 of groups #1, #2, #4, and #3, respectively. The metro ring 100 is connected also to a core network 110 via node 101-4.

In the network system with the above configuration, the increase in the variety of services that a PON provides may result in communication carried out between ONUs accommodated in different PONs. Specifically, as illustrated in FIG. 7, an ONU in the PON 102-1 of the group #1 ("A" in the drawing) establishes a setting for carrying out communication with an ONU belonging to the PON 102-3 of the different group #3 ("D" in the drawing) through the metro ring 100. That can realize grid computing that is a virtual high-performance computer system in which a number of computers are connected via a network.

Japanese Patent Application Laid-Open (KOKAI) No. 2003-244178

In an attempt of forming a grid-computing system with the resources in the metro ring 100, the metro ring 100 and additionally a PON downstream thereof would have a system configuration in which a number of computers are connected to one another. However, communication between ONUs connected to different node units 101 in the metro ring 100 is carried out with the aid of a large number of IP (Internet Protocol) routers and a large number of layer-2 switches that serve to function for switching the route on the layer 2 (L2) or the layer 3 (L3), as depicted in FIG. 8.

For example, as illustrated in FIG. 7, assuming that an ONU in the PON 102-1 of the group #1 (see "A" in the drawing) communicates with an ONU belonging to the PON 102-3 of another group #3 (see "D" in the drawing) through the metro ring 100, OLTs in the PONs 102-1 and 102-3 of the groups #1 and #3 perform processes in IP routers or L2 switch (see "A" and "D" in FIG. 8) and the node units 101-1, 101-7, 101-6, and 101-5 form the metro ring 100 serving as a relaying section each carry out processes with the use of IP routers. FIG. 8 illustrates processes performed by IP routers, particularly focusing on the node unit 101-1 (see "B" in FIG. 8) and the node unit 101-5 (see "C" in FIG. 8).

However, such L2 switches and IP routers for route switching normally perform a Store-and-Forward process in which a message is sent to a relay point, where the message is temporarily stored, and then forwarded to the next relaying point. A Store-and-Forward process is a cause of delay and jitter in information forwarding, and may make it difficult to provide adequate quality to a system, such as the above grid computing, with a high demand for delay and jitter.

SUMMARY

For the above, the present invention has characteristics defined by the following optical communication system, and the optical communication method and the communication unit thereof.

(1) According to an aspect of the invention, there is provided a communication unit used in an optical communication system in which at least two upper apparatuses that form a network communicating by an optical signal in a first optical communication scheme are each downstream connected to communication units and in which each of the communication unit is downstream connected to a terminal that transmits and receives an optical signal in a second optical communication scheme, the first communication unit including: a first terminator which terminates a communication channel in the first optical communication scheme between the first communication unit and a second communication unit through the network; a second terminator which terminates a signal in the second optical communication scheme; a path setting switch which selectively switches between a first signal path setting in which a signal in the second optical communication scheme between the first communication unit and the downstream terminal of the first communication unit is terminated at the second terminator and a signal in the second optical communication scheme between the first communication unit and a terminal which is accommodated in the second communication unit connected through the communication channel in the first optical communication scheme via the first terminator is terminated at the second terminator and a second signal path setting in which a signal in the second optical communication scheme between the first communication unit and the downstream terminal of the first communication unit is output through the communication channel in the first optical communication scheme to be terminated at the second communication unit and a signal in the second optical communication scheme input from the second communication unit through the communication channel in the first optical communication scheme via the first terminator skips a termination process performed thereon by the second terminator and is output to a terminal downstream connected to the first communication unit.

(2) According to another aspect of the invention, there is provided an optical system in which at least two upper apparatuses that form a network communicating by an optical signal in a first optical communication scheme are each downstream connected to communication units and in which each of the communication unit is downstream connected to a terminal that transmits and receives an optical signal in a second communication scheme, each of communication units including a first terminator which receives and transmits a signal through a communication channel in the first optical communication scheme between the first communication unit and a second communication unit via the network and which terminates the last-named signal, and a second terminator which terminates a signal in the second optical communication scheme; the first communication unit that is one of a plurality of the communication units through which the communication channel has been set comprising a first signal path setting section which sets a signal path so that a signal in the second optical communication scheme between the first communication unit and a terminal downstream connected to the first communication unit is terminated by the second terminator and formed into packets, and a route for each of the packets is switched in accordance with a destination of each of the packets, and a signal in the second optical communication scheme between the first communication unit and so that a terminal connected to a second communication unit that is one of the plurality of communication units is terminated by the second terminator and formed into packets and a route for each of the last-named packets is switched in accordance with a destination of each of the last-named packets; the second communication unit comprising a second signal path setting section which sets a signal path so that a signal from a terminal downstream connected to the second communication unit is output to the first communication unit through the communication channel and a signal from the terminal accommodated in the first communication unit connected through the communication channel is output to a terminal downstream of the second communication unit.

(3) According to another aspect of the invention, the is provided a method for optical communication in an optical system in which at least two upper apparatuses that form a network communicating by an optical signal in a first optical communication scheme are each downstream connected to communication units and in which each of the communication unit is downstream connected to a terminal that transmits and receives an optical signal in a second communication scheme, the method comprising: when communication is made between a first terminal connected to the first communication unit and a second terminal connected to the second communication unit, setting a communication channel in the first optical communication scheme between the first communication unit and the second communication unit through the network; at the first communication unit, terminating a signal in the second optical communication scheme communicated with the first terminal connected to the first communication unit, forming the signal into packets, switching a route for each of the packets in accordance with the destination of each of the packets, and terminating a signal in the second optical communication scheme communicated with the second terminal accommodated in the second terminal connected through the communication channel set, forming the last-named signal into packets and switching a route for each of the last-named packets in accordance with the destination of each of the last-named packets; at the second communication unit, outputting a signal from the second terminal of the second communication unit to the first communication unit through the communication channel, and outputting a signal, which is received from the first terminal accommodated in the first communication unit connected through the communication channel set, to a second communication terminal downstream connected to the second communication unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 9 is a diagram illustrating conventional application of a PON system to a ring network.

Figure 1:
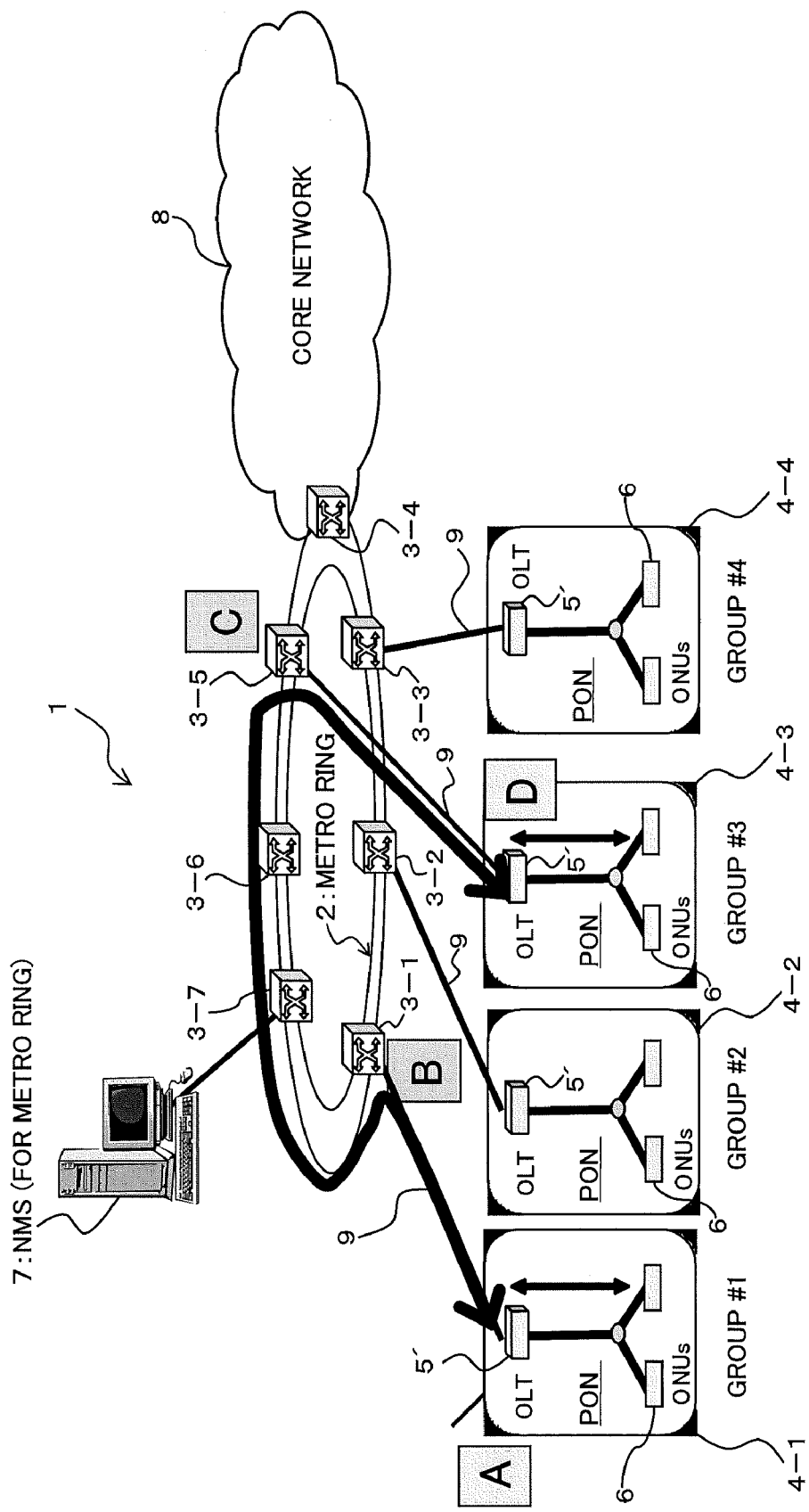
FIG. 1 is a block diagram illustrating an optical communication system according to a first embodiment of the present invention.

1 optical communication system
2, 100 metro ring
3-1 to 3-7, 101-1 to 101-7 node unit
31 transmission/access interface
32 L3/L2 switch
33 transmission interface
4-1 to 4-4, 102-1 to 102-4 PON
5' OLT
5, 105 communication unit
51, 111a PON interface
52, 111b PON/MAC controller
53, 111c Ethernet interface
54 L3/L2 switch
55 CWDM transmitter/receiver
56a, 56b first, second relay switch (path setting switch)
57 timing adjuster
58 DWDM transmitter/receiver
6, 106 ONU
6a communication terminal
7 NMS
8, 110 core network
10, 107 passive optical splitter
111 access interface
112,115 L3/L2 switch
113,114 transmission/access interface
116 transmission interface

DESCRIPTION OF EMBODIMENT(S)

Hereinafter, an embodiment will now be described with reference to the accompanying drawing.

(a) First Embodiment

Figure 2:
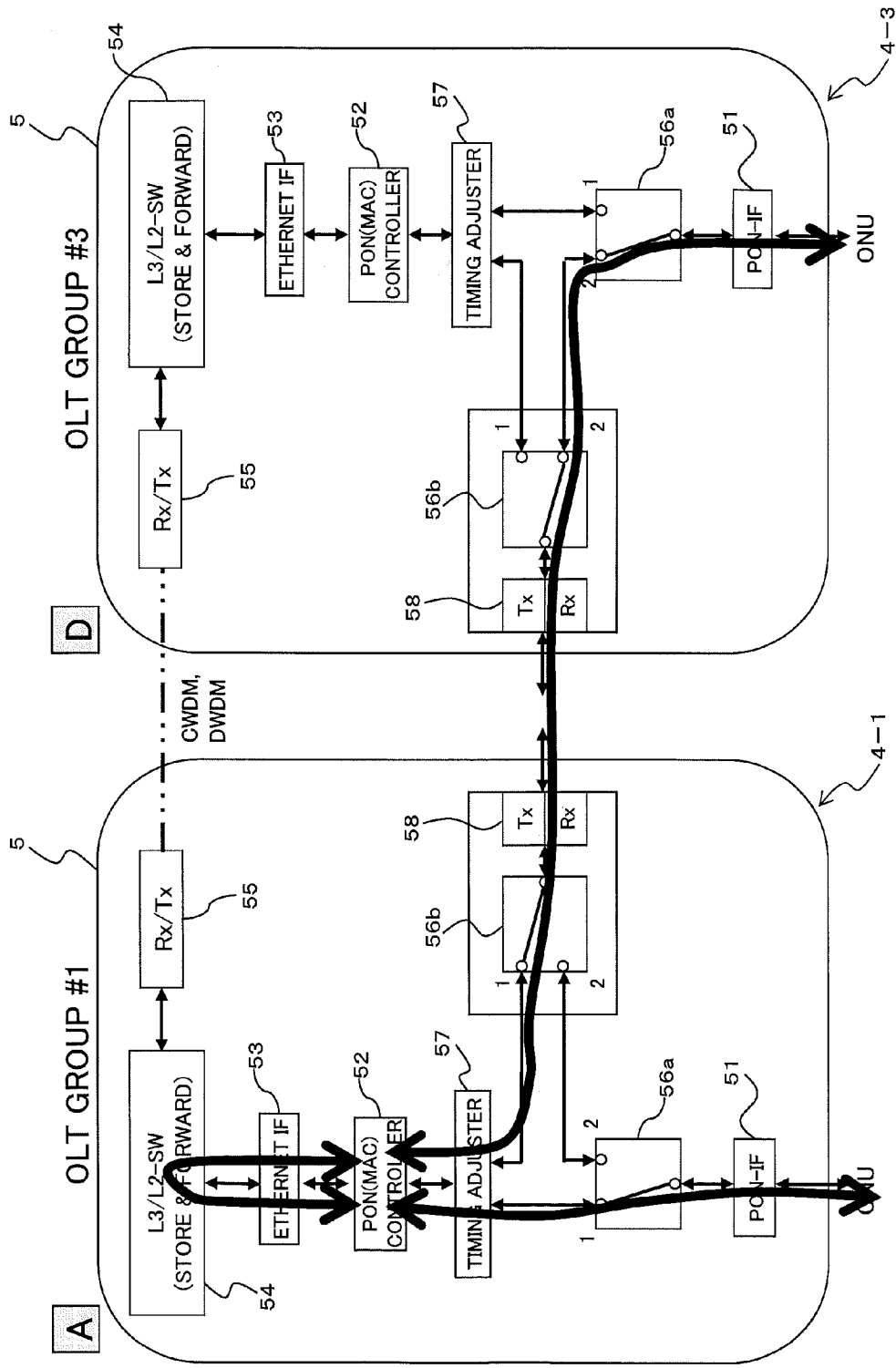
FIG. 2 is a block diagram focusing on the function of a communication unit of the optical communication system of the first embodiment.
Figure 3:
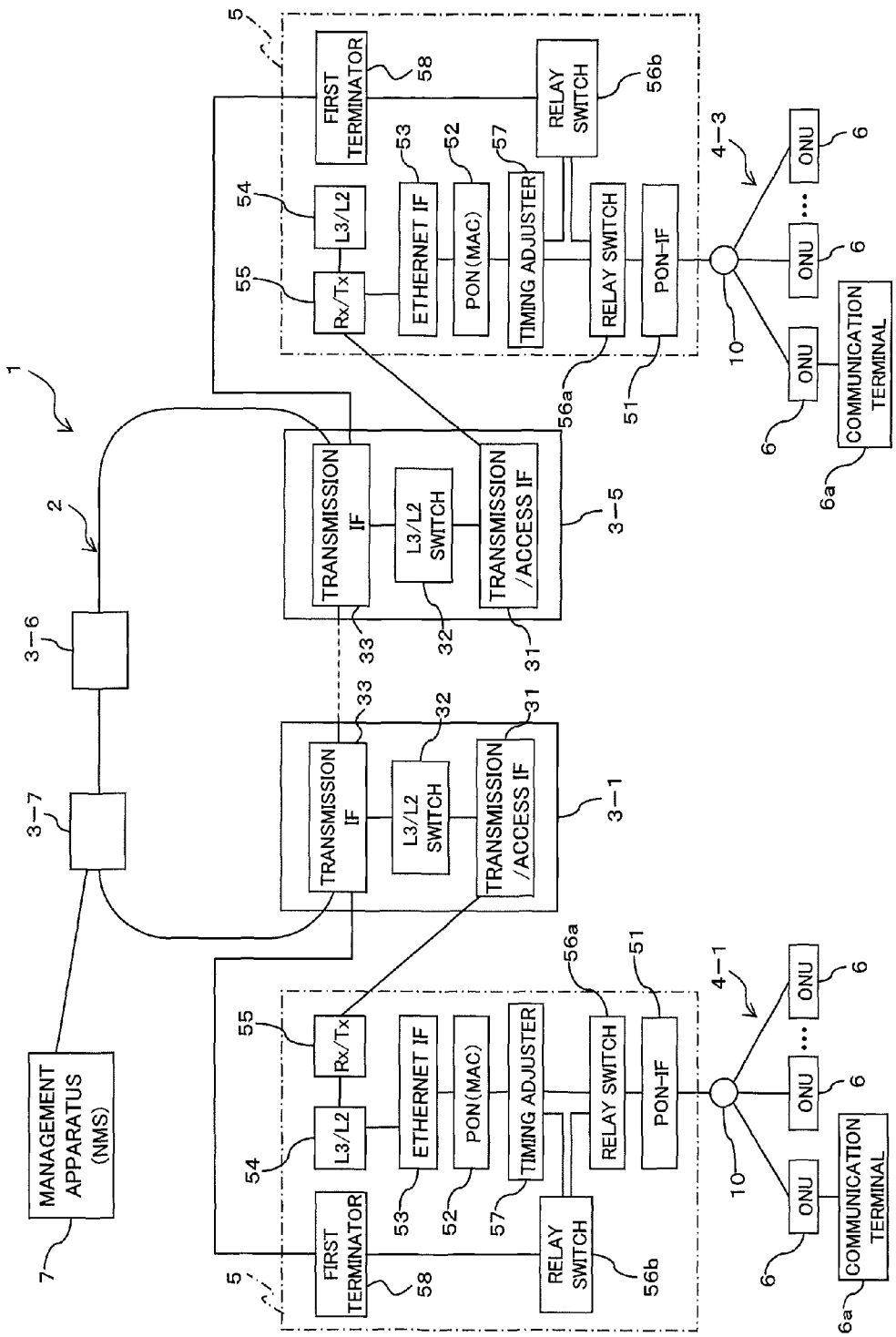
FIG. 3 is a block diagram illustrating an optical communication system of the first embodiment.

FIGS. 1 and 3 are block diagrams illustrating an optical communication system 1 according to a first embodiment of the present invention; FIG. 2 is a block diagram focusing on the function of a communication unit 5 of the optical communication system 1 of the first embodiment. Similarly to the system described with reference to FIG. 7, the optical communication system 1 illustrated in FIGS. 1 and 3 serves as a network system in which each of node units 3 forming a metro ring 2 accommodates a PON 4.

A PON 4 couples, for example, a communication unit 5 with an OLT function to a number of ONUs 6 by a passive optical splitter 10 and thereby forms a distributed topology in a tree structure. The reference number 8 represents a core network connected to a metro ring 2 through a node unit 3-4, and the reference number 9 is an optical path that connects a communication unit 5 and a node unit (upper apparatus) 3. Additionally, the communication unit 5 of each PON 4 may sum a number of OLT function with the presence of a non-illustrated L3/L2 switch. To ONUs 6, communication terminals 6a are connected which are capable of communicating with each other under the configuration of the optical communication system 1 of the first embodiment.

Figure 7:
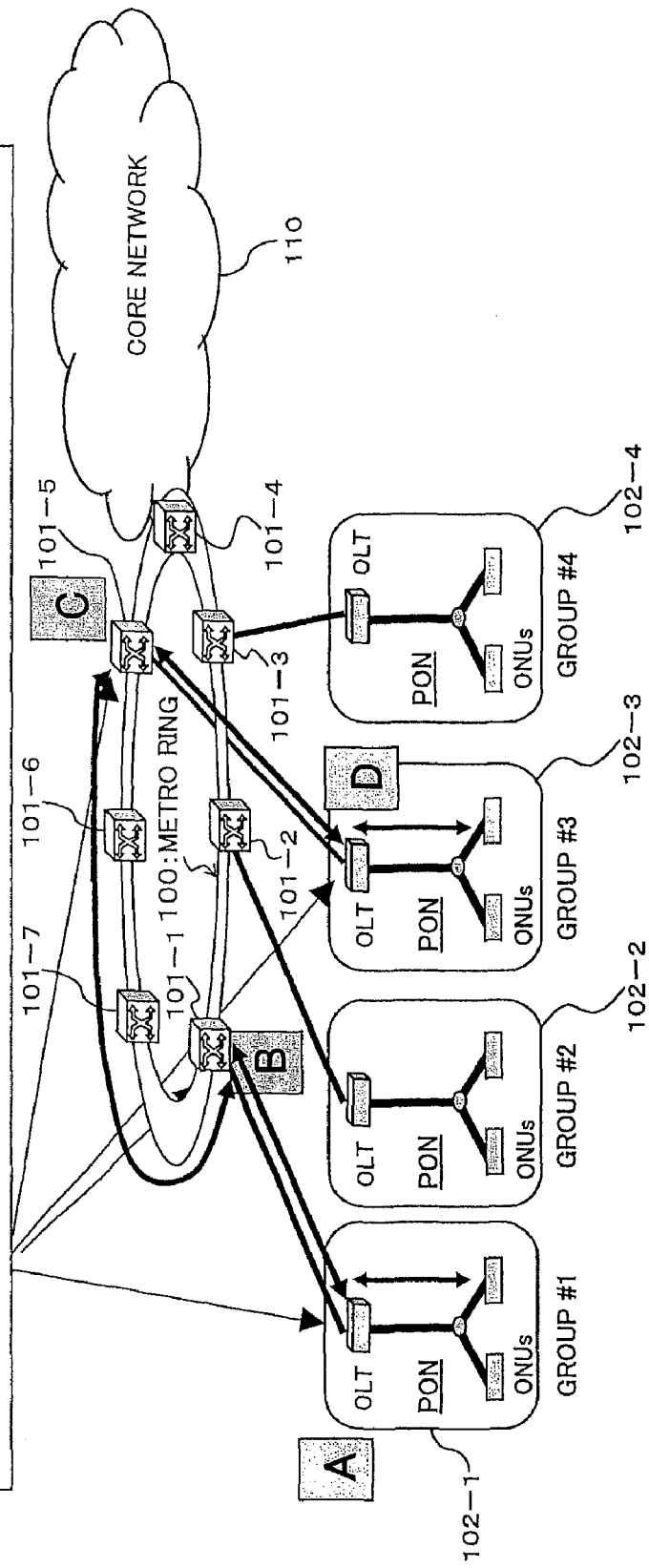
FIG. 7 is a diagram illustrating conventional application of a PON system to a ring network.

Here, differently from the system depicted in FIG. 7, the optical network system 1 of the first embodiment sets and secures between the communication units 5 in different PONs 4 a direct transmission channel (in this example, a DWDM channel) of the metro ring 2. For the above, the communication unit 5 with the OLT function of each PON 4 receives and transmits control signals (for communication settings between PONs 4) with an NMS (Network Management System) 7 connected to a node unit 3-7 to manage the metro ring 2. Such control signals may be received and transmitted between the communication unit 5 and the NMS 7 through the optical path 9 and the metro ring 2, or may be received and transmitted through another non-illustrated controlling-signal line.

The NMS 7 carries out channel setting for the metro ring 2 to directly connect the OLT functional section of the communication unit 5 of each PON 4 to the connection unit 5 of a destination PON 4, which requests communication with suppressed delay and jittering. For example, assuming that an ONU 6 of the PON 4-1 requests high-speed communication with an ONU 6 of the PON 4-3, the communication unit 5 of the PON 4-1 issues the request for the high-speed communication to the NMS 7, and in response to the request, the NMS 7 connects the communication unit 5 of the PON 4-1 in question and the communication unit 5 of the PON 4-3 through a DWDM channel.

Thereby, the ONU 6 in the PON 4-1 (Group #1, see "A" in FIG. 1) connected to the node unit 3-1 (see "B" in the drawing) in the metro ring 2 can be connected through a DWDM channel to the ONU 6 in the PON 4-3 (Group #3, see "D" in the drawing) connected to the node unit 3-5 (see "C" in the drawing).

Providing a configuration, such as MAC control or an L3/L2 switch, to switch an activating/deactivating state of the OLT function to the communication unit 5 of each PON 4, the communication between the ONU 6 of Group #1 and the ONU 6 of the Group #3 can be carried out by causing the OLT function such as an L3/L2 switch of the communication unit 5 in the Group #1 to be in an activating state while causing the OLT function of the communication unit 5 in the Group #3 to be in a deactivating state, for example.

Thereby, the communication unit 5 of the Group #1 substantially controls the ONUs 6 of the Group #3, so that the Groups #1 and #3 operate to be a single PON system. That is, the communication unit 5 in the PON 4-1 virtually accommodates the ONUs 6 in the PON 4-3 in addition to the own ONUs 6 accommodated in the PON 4-1.

Further, that can eliminate the operations of layer 2/3 switches performed in the node units 3-1, 3-7, 3-6, and 3-5 on the transmission path interposed between PONs 4-1 and 4-3 and in the communication unit 5 of the PON 4-3, so that a number of PONs 4 can be dynamically and seamlessly involved into the metro ring 2.

FIG. 2 illustrates the configuration of the communication unit 5 that realizes communication between ONUs 6 accommodated in PONs 4-1 and 4-3 as described above. As illustrated in FIG. 2, the communication unit 5 includes a PON interface 51 that realizes the OLT function, a PON/MAC (Media Access Control) controller 52, an Ethernet (trademark) interface 53, an L3/L2 switch 54, and a CWDM transmitter/receiver 55. In addition, the communication unit 5 includes first and second relay switches 56a and 56b, a timing adjuster 57, and a DWDM transmitter/receiver 58.

Hereinafter, description will be made focusing on the configuration of the communication unit 5 in the PON 4-1, but the remaining PONs 4-2 to 4-4 include the similar communication units 5.

As depicted in FIG. 3, each PON 4 in the first embodiment couples, for example, a single communication unit 5 with the OLT function to a number of ONUs 6 via a passive optical splitter 10 and thereby forms a distributed topology in a tree structure.

Here, the DWDM transmitter/receiver 58 terminates signals of the DWDM channel with a communication unit 5 in another PON (here, the PON 4-3) which channel has been set by the NMS 7, and serves as a second terminator that terminates a signal transmitted in a second optical communication scheme that is a wavelength multiplex communication scheme.

The PON interface 51 converts an optical signal transmitted in the second optical communication scheme of GE-PON from an ONU 6 into an electric signal and outputs the electronic signal in the form of a PON/MAC frame signal to the relay switch 56a. In addition, the PON interface 51 carries out a PON interface process on a PON/MAC frame signal inputted through the relay switch 56a and outputs the obtained optical signal to downstream ONUs 6 in the same group. Accordingly, the PON interface 51 has a function as a first interface which is connected to downstream ONUs 6 (communication terminals 6a) and which carries out an interface process in a passive optical subscriber network scheme.

The PON/MAC controller 52 performs an interface process on a PON/MAC frame signal inputted through the relay switch 56a and the timing adjuster 57, and outputs the signal in the form of an Ethernet frame signal to the Ethernet interface 53. In addition, the PON/MAC controller 52 performs an interface process on an Ethernet frame signal from the Ethernet interface 53 and outputs the signal in a PON/MAC frame signal to the timing adjuster 57.

The Ethernet interface 53 carries out an interface process on an Ethernet frame signal from the PON/MAC controller 52, and outputs the signal in the form of a packet signal to the L3/L2 switch 54. In addition, the Ethernet interface 53 performs an interface process on a packet signal from the L3/L2 switch 54 to form an Ethernet frame and outputs the Ethernet frame to the PON/MAC controller 52.

Accordingly, the PON/MAC controller 52 and the Ethernet interface 53 serve as a second interface which carries out a signal interface process in a Gigabit Ethernet scheme.

Here, in performing of an interface process in the PON/MAC controller 52, a multi-point MAC control is defined for one-to-many terminals in use of Ethernet as described in a reference (Osamu ISHIDA, Koichiro SETO, "10 Gigabit Ethernet textbook (revised), page 225-232, IMPRESS) so that access control is realized over a number of terminals involved in a signal PON 4.

In a PON 4, a signal (downlink signal) from the OLT to ONUs is normally a broadcast type and therefore is sent to all the ONUs connected via the splitter 10; but signals (uplink signal) from ONUs to the OLT are N:1 (N is a number of two or more) and therefore signals transmitted from a number of ONUs are coupled in the splitter so that the transmission timings are controlled not to collide the signals transmitted from different ONUs with one another.

Figure 4:
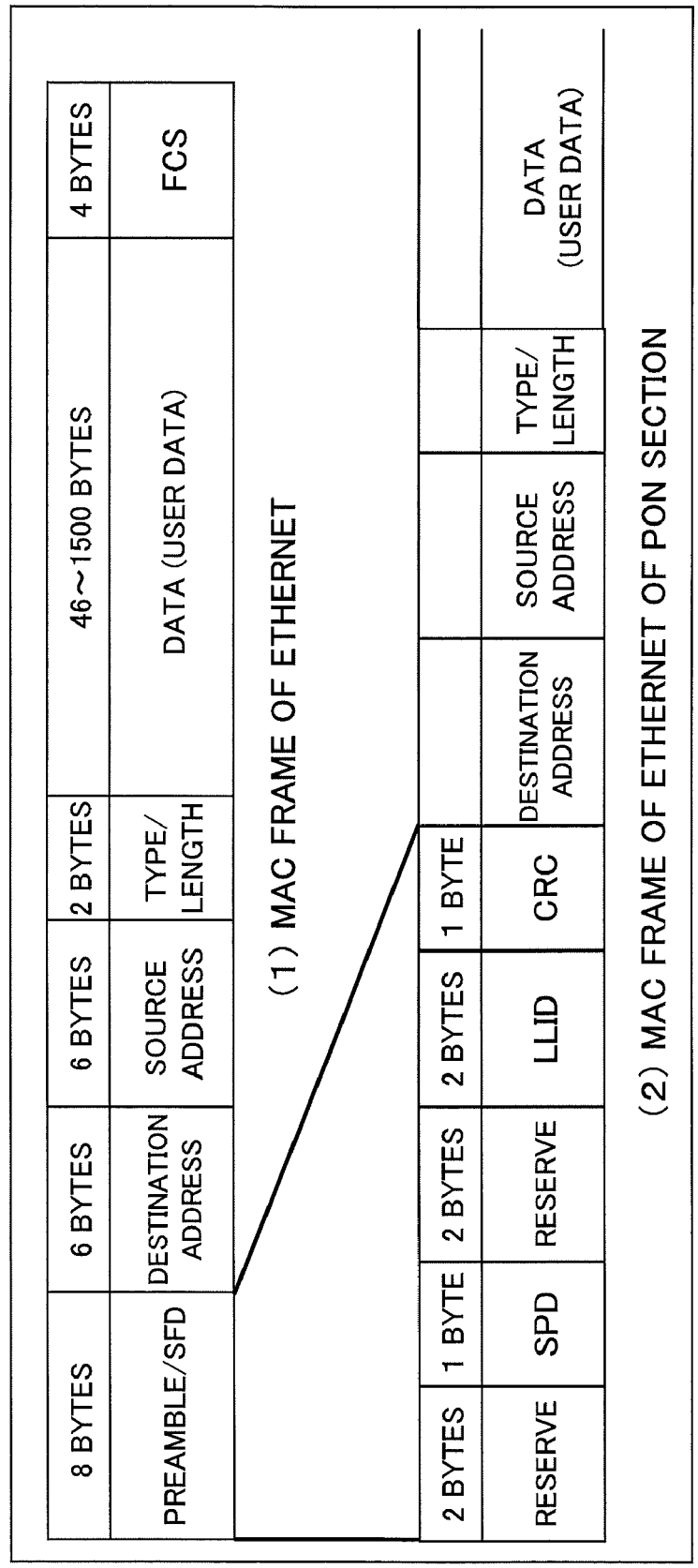
FIG. 4 in part (1) is a diagram depicting a MAC frame of Ethernet (trademark) and in part (2) is a diagram depicting a MAC frame of Ethernet (trademark) of a PON section.

As described above, a PON 4 physically includes a shared connection configuration, but the logical connection between the communication unit 5 and an ONU 6 is a Point-to-Point formation between the PON/MAC controller 52 and the MAC function of the ONU 6. For discrimination of a logical connection between a communication unit 5 and an ONU 6 from a connection between the communication unit 5 and another ONU 6, the PON/MAC controller 52 in the communication unit 5 and the MAC function of the ONU 6 define an LLID (Logical Link Identification) at a preamble portion as denoted in FIG. 4(2) differently from a normal MAC frame (see FIG. 4(1)), so that transmission and receiving of Ethernet (trademark) MAC frame can be controlled in a unit of LLID.

An LLID discriminates the logical connection between a communication unit 5 and an ONU 6 from another communication between the communication unit 5 and an ONU 6, and is set on the preamble portion of eight bytes from the top on an Ethernet (trademark) MAC frame transmitted and received in section of a PON 4 (between PONs 4). Therefore, an LLID is used only in a PON section. The Ethernet (trademark) MAC frame on a PON section depicted in FIG. 4(2) is identical with the Ethernet (trademark) MAC frame on a PON section depicted in FIG. 4(1) except for the LLID.

With this configuration, in performing communication from the communication unit 5 to the ONUs 6, a MAC frame output from the PON/MAC controller 52 that executes the OLT function reaches all the ONU. Upon receipt of the MAC frame, each ONU 6 discards a frame with an LLID not destined for the ONU 6, but captures a frame with an LLID destined for the ONU 6 in question.

On the other hand, in performing communication from an ONU 6 to the communication unit 5, the ONU 6 can transmit MAC frames only during the time period allocated by the OLT functional section in the communication unit 5, which includes the PON/MAC controller 52. The ONU 6 calculates an amount of frame being accumulated in a transmission buffer and requests the PON/MAC controller 52 in the communication unit 5 to allocate a required transmission time period. The OLT functional section in the communication unit 5 allocating a permitted time point and a permitted time period for frame transmission, the ONU 6 can transmit MAC frames for the permitted time period from the permitted time point.

The L3/L2 switch 54 serves as a route switch that switches the routes for a packet signal from the Ethernet interface 53 and a packet signal from the CWDM transmitter/receiver 55 in accordance with the destinations of the packets, and can be formed of, for example, an IP router.

The first and the second relay switches 56a and 56b in cooperation with each other switch OLT function of the communication unit 5 between activation and deactivation, and are each exemplified by 1×2 switches.

For example, when ONUs 6 in PON 4-1 and 4-3 depicted in FIG. 1 are formed into a single PON system, setting of the first and the second relay switches 56a and 56b in each of the communication units 5 activates the OLT function of the communication unit 5 in the PON 4-1 and deactivates the OLT function of the communication unit 5 in the PON 4-3.

Specifically, the first relay switch 56a of the communication unit 5 in the PON 4-1 connects the PON interface 51 and the PON/MAC controller 52 through the timing adjuster 57, so that the same communication unit 5 can terminate in the GE-PON scheme signals transmitted with the downstream ONUs 6 of the same communication unit 5. Further in this case, the second layer switch 56b connects the DWDM transmitter/receiver 58 and the PON/MAC controller 52 through the timing adjuster 57, so that the PON/MAC controller 52 can terminate in the GE-PON scheme a MAC frame transmitted and received through a DWDM channel set with respect to the communication unit 5 at the communication destination (i.e., in the PON 4-3). Thereby the OLT function of the communication unit 5 in the PON 4-1 can be activated.

In the meanwhile, the first and the second relay switches 56a and 56b in the communication unit 5 of the PON 4-3 connect the DWDM transmitter/receiver 58 and the PON interface 51 and disconnect the PON interface 51 from the PON/MAC controller 52 (performing the OLT function). That can deactivate the function of the communication unit 5 as an OLT.

Thereby, since the ONUs 6 in the PON 4-3, along with the ONUs 6 in the PON 4-1, can be controlled by the OLT functional section of the communication unit 5 in the PON 4-1, the ONUs 6 in the PONs 4-1 and 4-3 can be incorporated into a single PON. In other words, ONUs 6 belonging to different groups (the PONs 4-1 and 4-3) can be controlled by the PON/MAC controller 52 of the communication unit 5 in the PON 4-1 with the use of a common LLID. That makes the ONUs 6 to communicate each other assuming to be in a single PON system.

As the above, forming a single PON by the ONUs 6 in different PONs 4-1 and 4-3 can eliminate a Store-and-Forward process following L3/L2 switching that has been carried out in an node unit 3 of the metro network and the communication unit 5 of the PON 4-3, so that delay and jitter in communication can be greatly reduced.

Conversely, a communication unit 5 that activates the OLT function thereof may be the communication unit 5 in the PON 4-3 and the communication unit 5 in the PON 4-1 may deactivate the OLT function thereof.

Accordingly, cooperation of the first and the second relay switches 56a and 56b realizes a path setting switch that selectively switches between: a first signal path setting in which the PON/MAC controller 52 and the Ethernet interface 53, which serve as the second interface perform, an interface process (terminate) on a signal transmitted in the GE-PON scheme between the communication unit 5 in question (i.e., the communication unit in the PON 4-1) and the downstream ONU 6 in the same communication unit 5 and also terminate a signal transmitted in the GE-PON scheme with an ONU 6 accommodated in another communication unit 5 through a communication channel conforming to a wavelength multiplexing optical communication scheme via the DWDM transmitter/receiver 58 serving as the first terminator; and a second signal path setting in which a signal transmitted in the GE-PON scheme between the communication unit 5 in question and a downstream ONU 6 of the same communication unit 5 is output through the communication channel conforming to the wavelength multiplexing optical scheme so that the signal is terminated in another communication unit 5 and the PON/MAC controller 52 and the Ethernet interface 53 skip a termination process on a signal in the GE-PON scheme inputted via DWDM transmitter/receiver 58 from another communication unit 5 through the communication channel conforming to the wavelength multiplexing optical scheme, which signal is then output to a downstream ONU 6 of the same communication unit 5.

In the selection for the above first signal path setting, a signal path to the downstream ONU 6 is set so as to be connected through the PON interface 51 to the PON/MAC controller 52 and the Ethernet interface 53, and a signal path to the ONU 6 accommodated in another communication unit 5 via the DWDM transmitter/receiver 58 is set so as to be connected to the PON/MAC controller 52 and the Ethernet interface 53 via the DWDM transmitter/receiver 58.

In the selection for the second signal path setting, a signal path to the downstream ONU 6 is set so as to be connected via the PON interface 51 to the DWDM transmitter/receiver 58, and a signal path connected via the DWDM transmitter/receiver 58 to the ONU 6 accommodated in another communication unit 5 is set so as to be connected via DWDM transmitter/receiver 58 to the PON interface 51.

In other words, the first and the second relay switches 56a and 56b of a communication unit 5 (with an activated OLT function) in which the PON/MAC controller 52 manages an LLID and the L3/L2 switch 54 carries out switching set to the first signal path and the remaining communication units 5 are set to the second signal path to deactivate the OLT function thereof.

As illustrated in FIG. 2, when the communication unit 5 in the PON 4-1 manages an LLID at the PON/MAC controller 52 and carries out switching at the L3/L2 switch 54, the first and the second relay switches 56a and 56b of the communication unit 5 in PON 4-1 are set to the first signal path meanwhile the first and the second relay switches 56a and 56b of the communication unit 5 in PON 4-3 are set to the second signal path.

The timing adjuster 57 adjusts a timing to input an uplink signal, particularly a signal from an ONU 6 to a communication unit 5, into the PON/MAC controller 52.

The PON/MAC controller 52 of the communication unit with the activated OLT function, specifically the communication unit 5 in the PON 4-1 here, allocates a signal transmission timing (or a reception timing at the OLT) to each ONU virtually included in a single PON (the ONUs 6 in the PON 4-1 and the ONUs 6 in the PON 4-3).

However, since the ONUs 6 in the PON 4-3 connected via the DWDM channel are interposed by the metro ring 2 via optical fiber transmission path in contrast to the ONUs 6 in the PON 4-1, the refractive index of the optical fiber varies with temperature variation even if the Store-and-Forward process is not carried out. In particular, in order to realize communication not annoyed by delay and jitter, measures are needed against variation in arrival timings of uplink signals.

The timing adjuster 57 absorbs a deviation of the allocated arrival timing of an uplink signal from an ONU 6 in the PON 4-3 connected through the DWDM channel by buffering the signal and concurrently outputs the uplink signal to the PON/MAC controller 52 serving as the OLT functional section. If an uplink signal from an own ONU 6 in the PON 4-1 has a deviation factor in the arrival timing, the timing adjuster 57 can absorb the timing deviation similarly.

The CWDM transmitter/receiver (Rx/Tx) 55 is connected to the L3/L2 switch 54, and forms a packet inputted as the result of switching the route in the L3/L2 switch 54 into Ethernet frames and outputs through the transmission path 9 the frames in the form of a CWDM optical signal to the metro ring 2. Such a CWDM optical signal output from the CWDM transmitter/receiver 55, differently from the DWDM channel for the DWDM transmitter/receiver 58, is converted into the original packet signal through an Ethernet interface process for L3/L2 switching each time the signal is inputted into the relaying node unit 3-1.

As depicted in FIG. 3, each node unit 3 constituting the metro ring 2 includes a transmission/access interface (IF) 31, an L3/L2 switch 32, and a transmission interface (IF) 33.

Specifically, focusing on the node unit 3-1 that accommodates the PON 4-1, the transmission/access interface 31 terminates a CWDM optical signal input through the optical transmission path 9 from the communication unit 5 in the PON 4-1, and performs an Ethernet interface process to convert the CWDM optical signal into a packet signal. Conversely, the transmission/access interface 31 carries out an interface process and a termination process in the CWDM on a packet signal from the L3/L2 switch 32, and then outputs a packet signal in the form of a CWDM optical signal through the optical transmission path 9 to the communication unit 5 in the PON 4-1.

Similarly to the L3/L2 switch 54 of a communication unit 5, the L3/L2 switch 32 carries out route switching in accordance with the destination of a packet signal inputted.

Further, the transmission interface 33 performs an Ethernet interface process and a termination process in DWDM on a packet signal that has been subjected to the route switching in the L3/L2 switch 32, and outputs the packet signal in the form of a DWDM optical signal to a node unit (the node unit 3-7 in the example of FIG. 1) arranged on the route to the destination.

If the DWDM transmitter/receiver 58 in a communication unit 5 sets a DWDM channel, a DWDM optical signal from the DWDM transmitter/receiver 58 is directly input into the transmission interface 33 (the signal is not converted into an electric signal and therefore remains to be an optical signal) without passing through the transmission/access interface (IF) 31 and the L3/L2 switch 32, and is output to the transmission unit 3-7 on the path to the destination in accordance with the channel set. Similarly, the DWDM optical signal remains in other relaying node units 3-7, 3-6, and 3-5 to be an optical signal without being converted into an electric signal and is subjected to route switching such as cross connect in accordance with the set channel so that the optical signal from the PON 4-1 is transmitted to the communication unit 5 in the PON 4-3.

When the optical communication system 1 with the above configuration is to carry out communication (with relatively high quality due to reduction of delay and jitter) between an ONU 6 connected to the communication unit 5 in the PON 4-1 and an ONU 6 connected to the communication unit 5 in a different PON 4-3 as illustrated in FIGS. 1 and 2, a communication channel in DWDM is, first of all, set between the PONs 4-1 and 4-3 through the metro ring 2.

Figure 5:
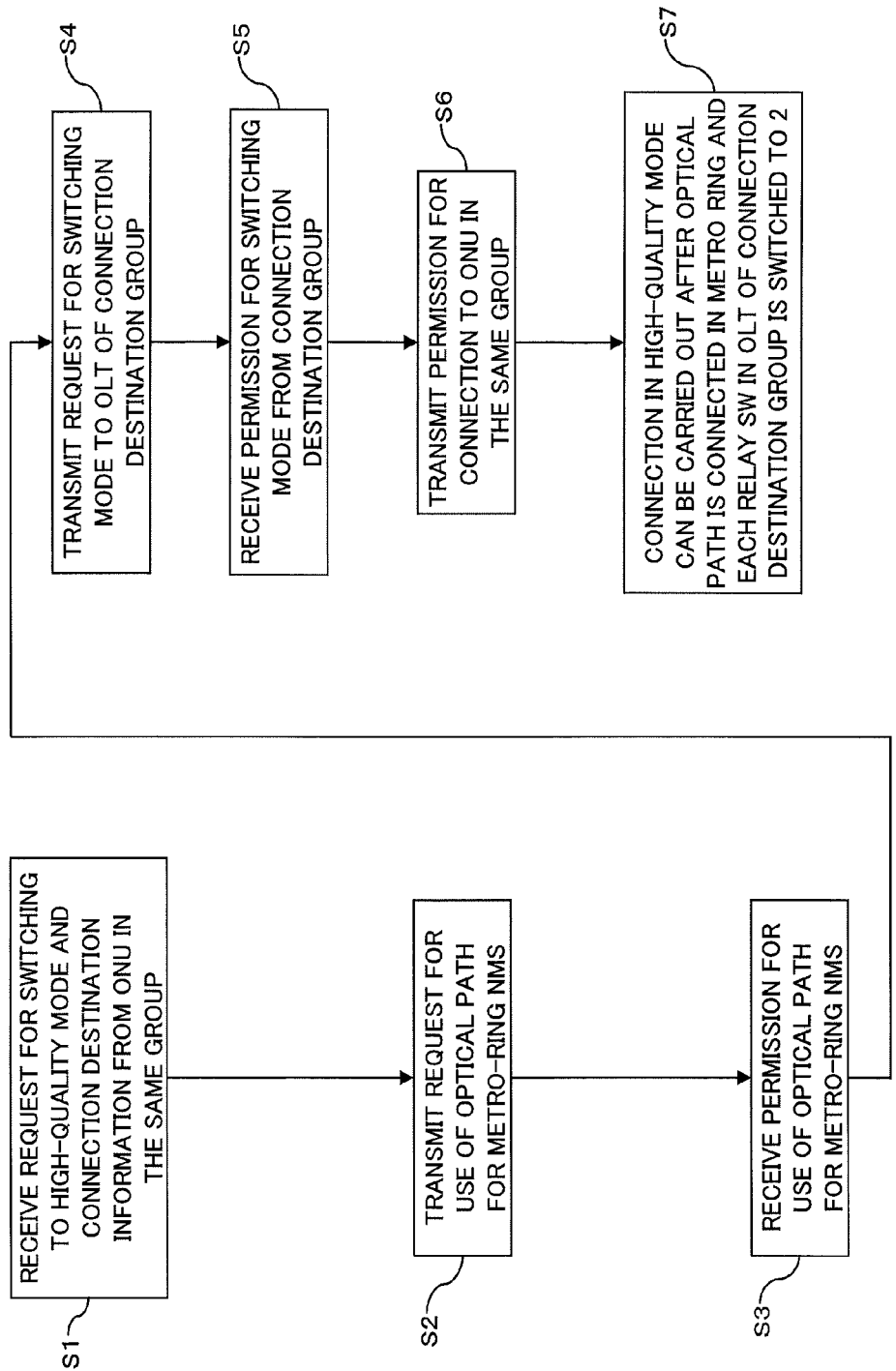
FIG. 5 is a flow diagram denoting a procedural step of establishing a communication path between communication units in different PONs.

For example, as denoted in flow diagram FIG. 5, an ONU 6 (an ONU 6 connected downstream of the communication unit 5) in one of the PONs 4-1 and 4-3, here in the PON 4-1, notifies the communication unit 5 in the PON 4-1 (the communication unit 5 connected to the ONU 6 in question) of a request to switch to an operation mode in which the above communication of relatively high-quality is carried out and of information of the ONU 6 that is to be the communication destination. The information about the ONU 6 to be the communication destination is identification information, such as an address allocated to the same ONU 6, peculiar to the ONU 6 and can optionally contain identification information of the communication unit 5 of the PON 4 accommodating the ONU 6.

Upon receipt of such information about the ONU 6 to be the communication destination (step S1), the communication unit 5 issues a request for setting a communication cannel connected to the communication unit 5 accommodating the terminal of the communication destination to the NMS 7 that controls allocation of a DWDM channel in the metro ring 2 under the control of the PON/MAC controller 52 (step S2).

Upon receipt of the setting request, the NMS 7 allocates a DWDM communication channel in response to the request and replies the permission to use the allocated communication channel to the communication unit 5, which has issued the setting request.

Upon receipt of the permission to use the DWDM channel from the NMS 7 (step S3), the communication unit 5 that has issued the setting request requests the PON/MAC controller 52 in the communication unit 5 that is to be the connection destination to switch the mode to a high-quality communication mode through a DWDM channel of the DWDM transmitter/receiver 58 as a substitute for a normal-quality communication mode through the CWDM transmitter/receiver 55 (step S4).

The communication unit 5 which receives the above switching request accepts the mode switching request if the communication unit 5 is in an operation state capable of the mode switching. In this case, the same communication unit 5 returns a mode switching permission signal to the communication unit 5 that has issued the switching request. Upon reception of the mode switching permission signal from the communication unit 5 at the communication destination (step S5), the communication unit 5 that has issued the switching request sends to an ONU 6 belongs to the own group a signal to permit connection in a high-quality mode (step S6).

After that, the first and the second relay switches 56a and 56b in the communication units 5 of the PONs 4-1 and 4-3, which respectively are the source of the switching request and the connection destination as illustrated in FIG. 2, switches the operation states to states for a high-quality mode, so that high-quality communication in which an amount of delay is suppressed can be carried out between the PONs 4-1 and 4-3 (step S7). For example, the first and the second relay switches 56a and 56b in the communication units 5 in the source of the connection request are switched so as to take the first signal path setting (the connection setting "1" in the drawing) and the first and the second relay switches 56a and 56b in the communication units 5 of the connection destination is switched so as to take the second signal path setting (the connection setting "2" in the drawing).

Specifically, the communication unit 5 in the PON 4-1 terminates a signal transmitted in the GE-PON scheme with the ONU 6 connected to the same communication unit 5, forms the signal into packets and causes the L3/L2 switch 54 to switch the route in accordance with the destination in a unit of packet. Meanwhile, the communication unit 5 in the PON 4-1 also terminates a signal transmitted in the GE-PON scheme with the ONU 6 accommodated in the communication unit 5 of the PON 4-3 connected by the communication channel set through the DWDM transmitter/receiver 58, forms the signal into packets and causes the L3/L2 switch 54 to switch the route in accordance with the destination in a unit of packet.

The communication unit 5 in the PON 4-3 outputs a signal from the terminal unit 6 downstream of the communication unit 5 in question to the communication unit 5 of the PON 4-1 through the communication channel set by the DWDM transmitter/receiver 58, and outputs a signal from ONU 6 accommodated in the communication unit 5 of the PON 4-1 which is connected through the communication channel set by the DWDM transmitter/receiver 58 to an ONU 6 downstream of the communication unit 5 of the PON 4-3 in question.

Figure 6:
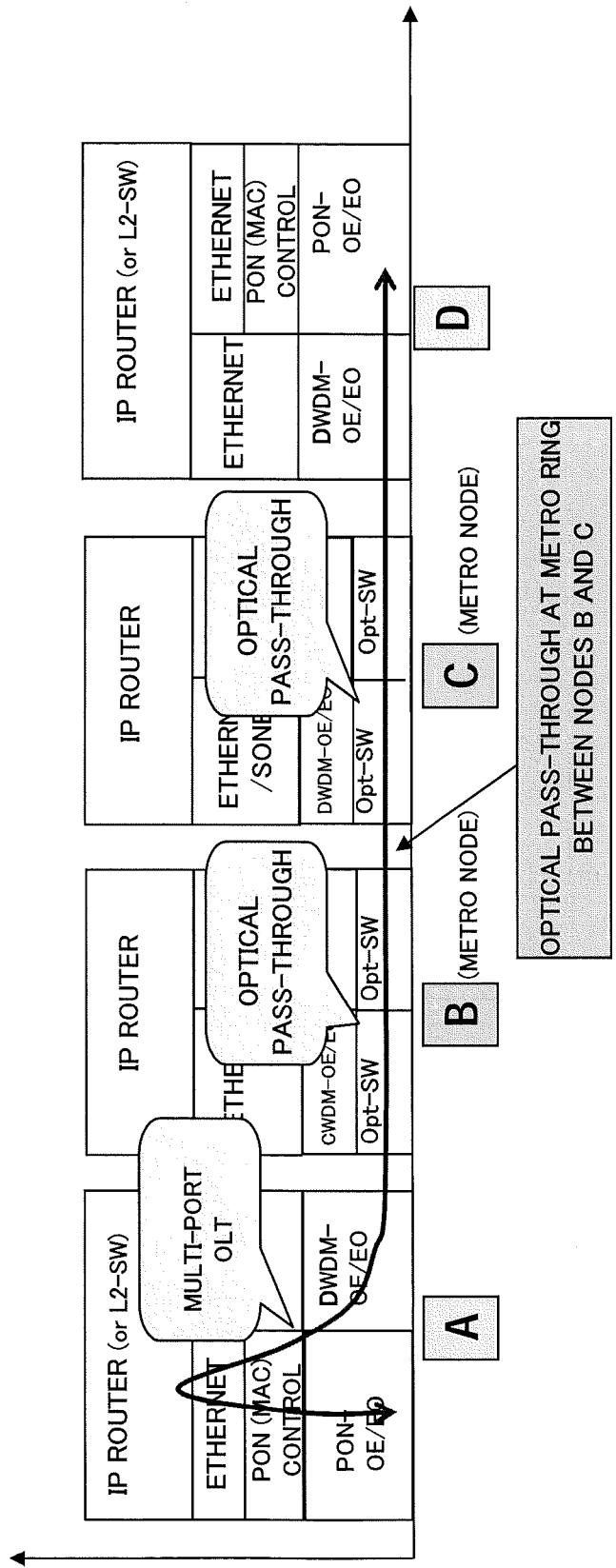
FIG. 6 is a diagram illustrating effects of the first embodiment.

Since a DWDM channel is set between the PONs 4-1 and 4-3 that are to be carried out high-quality communication through the communication units 5 thereof, a signal from an ONU 6 of the PON 4-1, after having been subjected to route switching in accordance with the destination in the L3/L2 switch 54 of the communication unit 5 (see "A" in FIG. 6) as illustrated in the example FIG. 6, is transmitted in the form of an optical signal of the DWDM channel to the destination communication unit 5 of the PON 4-3 by optical path-through (i.e., not to be converted into an electric signal) (see "D" in FIG. 6).

Figure 8:
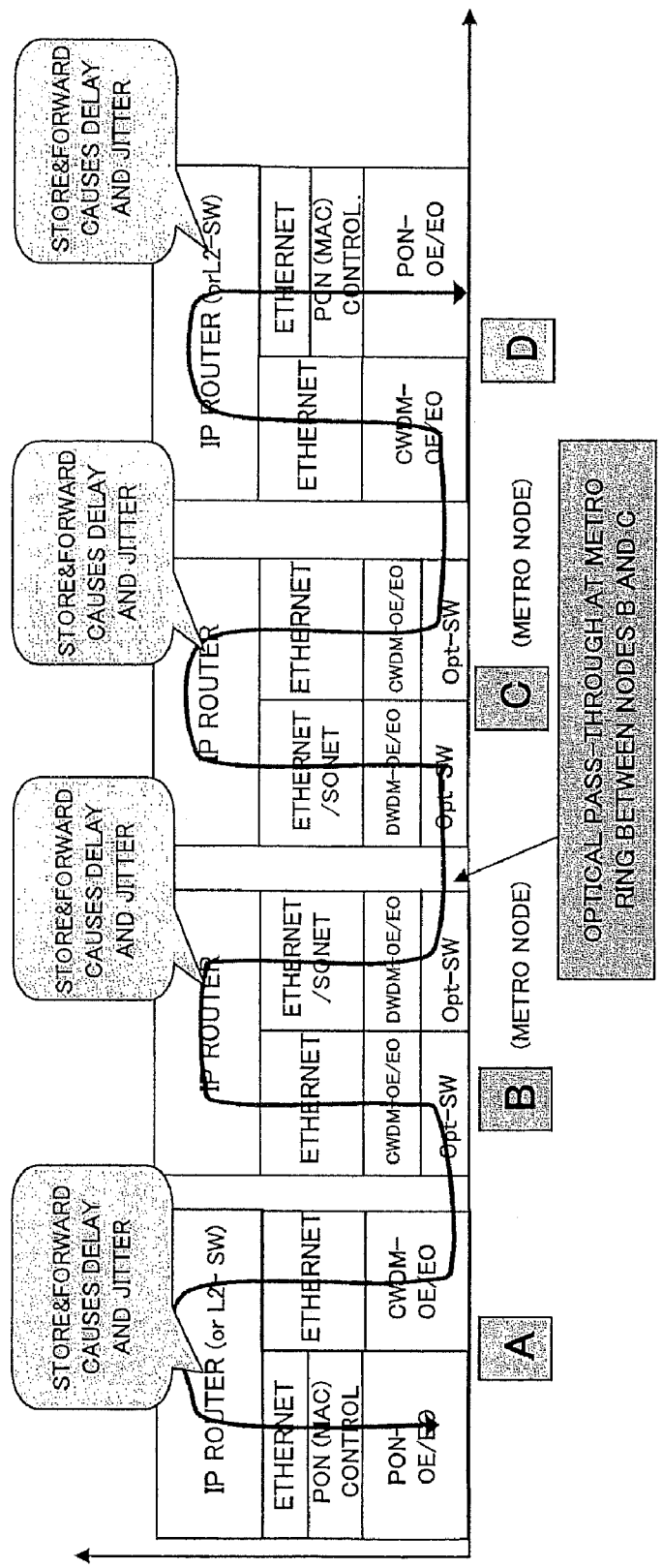
FIG. 8 is a diagram illustrating effects caused by conventional application of a PON system to a ring network.

Namely, the relaying node apparatus 3-1 and 3-5 (see "B" and "C" in FIG. 6) can skip Store-and-Forward process exemplified by L3/L2 switching as depicted in FIG. 8, so that communication quality can be greatly improved by suppressing delay and jitter as compared to a communication mode depicted in FIG. 8 or 9.

FIG. 9 describes a procedure of a signal processing to carry out communication between ONUs 106 of PONs 102-1 and 102-3 in a metro ring 100 depicted in FIG. 7 in association with FIG. 8. A communication unit 105 includes access IF (interface) 111, an L3/L2 switch 112, and a transmission/access IF 113. Anode unit 101 includes a transmission/access IF 114, an L3/L2 switch 115, and a transmission IF 116 (the illustration in FIG. 9 particularly focuses on nodes 101-1 and 101-5). Reference number "107" represents a passive optical splitter.

The access IF 113 in a communication unit 105 includes elements (reference numbers 111a through 111c) respectively corresponding to the PON interface 51, the PON/MAC controller 52 and the Ethernet interface 53 illustrated in FIG. 3. The L3/L2 switch 112 corresponds to the L3/L2 switch 54 depicted in the same drawing FIG. 3. The transmission/access IF 113 carries out an interface process on communication with transmission/access interface 114 in the accommodating node unit 101 through a CWDM channel (at a relatively low band) different from a communication channel set in the metro ring 100, and corresponds to the CWDM transmitter/receiver 55 depicted in FIG. 3. The transmission/access IF 114 in the node unit 101 interfaces a CWDM communication channel established with the communication unit 105 downstream thereof. The transmission IF 116 interfaces a DWDM signal transmitted through the metro ring 100. The L3/L2 switch 115 (sic) performs L3/L2 switching on a signal between the transmission interface 116 and the transmission/access interface 114. Focusing on a signal transmitted from the communication unit 105 in the PON 102-1 to the communication unit 105 in the PON 102-3 through the node units 101-1 and 101-7 to 101-5, a CWDM signal from the PON 102-1 is subjected to optical switching (Opt-SW in "B" in FIG. 8) in the transmission/access IF 114 in the node unit 101-1 and the CWDM light is converted into an electric signal in the form of an Ethernet frame, which is further converted into a packet signal (from CWDM-OE to Ethernet in "B" in FIG. 8). The L3/L2 switch 115 (sic) switches the route of the packet signal from the transmission/access interface 114 in accordance with the destination of the signal (the IP router in "B" in FIG. 8), and converts the packet signal into an Ethernet frame (or an SONET frame), which is then transmitted in the form of a DWDM signal (Ethernet/SONET, DWDM-EO in "B" in FIG. 8). After that, the substantially same procedure is repeated in each of the node units 101-7 to 101-5, so that the signal from the communication unit 105 in the PON 102-1 reaches the communication unit 105 in the PON 102-3.

With the presence of both the DWDM transmitter/receiver 58 serves as the first terminator that terminates a communication channel established in the first optical communication scheme with another communication unit through the ring network and the first and the second route switch 56a and 56b serving as a path setting switch in the first embodiment of the present invention, the communication between PONs 4 connected to different nodes 3 in the metro ring 2 inhibits delay and jitter, and dynamically and seamlessly connection reduces the hop number, so that a high-quality service with reduced delay can be advantageously realized.

In the above case, the communication unit 5 that accommodates an ONU 6 of the PON 4-1 that is the connection request source sets the first and second relay switches 56a and 56b in the same communication unit 5 to be in the first signal path setting and can thereby carry out PON/MAC control meanwhile the communication unit 5 that accommodates an ONU 6 of the PON 4-3 that is the connection destination sets the first and second relay switches 56a and 56b to be in the second signal path setting.

Alternatively, the communication unit 5 that accommodates an ONU 6 of the PON 4-3 that is the connection destination may set the first and second relay switches 56a and 56b in the same communication unit 5 to be in the first signal path setting and can thereby carry out PON/MAC control meanwhile the communication unit 5 that accommodates an ONU 6 of the PON 4-1 that is the connection request source may set the first and second relay switches 56a and 56b to be in the second signal path setting.

In the normal operation mode in which the DWDM transmitter/receiver 58 does not set a DWDM channel, the first relay switch 56a may be connected to both the PON interface 51 and the timing adjuster 57 (connection setting "1" in the drawing) and concurrently the state of the second layer switch 56b may be set to be in a disconnected state from the first relay switch 56a or from the timing adjuster 57.

(b) Others

Various modifications to the foregoing embodiment can be made without departing from the concept of the claims of the present invention.

The above first embodiment particularly focuses on the communication established between ONUs 6 in two PONs 4-1 and 4-3. However, the present invention is not limited to this, and can be applied to communication established among ONUs 6 accommodated in three or more PONs 4. Specifically, the communication unit 5 in a single PON 4 (for example, PON 4-1) is connected to each of the communication units 5 in the two or more remaining PONs 4 through a DWDM channel serving as a communication channel in the first optical communication scheme, so that the ONUs 6 accommodated in three or more PONs 4 can inhibit delay and jitter and reduce the hop number by dynamic and seamless connection. Consequently, it is possible to realize a high-quality service.

In the first embodiment, the network formed by node units accommodating the PONs 4 is exemplified by a metro ring, to which the present invention is not limited. The present invention can be applied to other networks. The disclosure of the first embodiment can produce the apparatus described in the claims of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication unit used in an optical communication system including: a first upper apparatus and a second upper apparatus that communicate with each other by an optical signal in a first optical transmission scheme; the communication unit that is located downstream from the first upper apparatus and communicates with the first upper apparatus; an another communication unit that is located downstream from the second upper apparatus and communicates with the second upper apparatus; a first terminal that is located downstream from the communication unit; and a second terminal that is located downstream from the another communication unit, the first terminal and the second terminal communicate with each other by an optical signal in a second optical transmission scheme through the communication unit, the first upper apparatus, the second upper apparatus, and the another communication unit, the communication unit comprising:

a first terminator operable to terminate a communication channel in the first optical communication scheme between the communication unit and the another communication unit through the first upper apparatus and the second upper apparatus;

a second terminator operable to terminate the optical signal in the second optical communication scheme;

a switch which selectively switches between a first setting in which a first optical signal in the second optical communication scheme between the communication unit and the first terminal is terminated at the second terminator and a second optical signal in the second optical communication scheme between the communication unit and the second terminal connected through the communication channel in the first optical communication scheme via the first terminator is terminated at the second terminator and a second setting in which the first optical signal in the second optical communication scheme between the communication unit and the first terminal is output through the communication channel in the first optical communication scheme to be terminated at the another communication unit and the second optical signal in the second optical communication scheme input from the another communication unit through the communication channel in the first optical communication scheme via the first terminator skips a termination process performed by the second terminator and is output to the first terminal.

2. A communication unit according to claim 1, wherein the first optical communication scheme is a wavelength multiplexing optical communication scheme; and the second optical communication scheme is a Gigabit Ethernet passive optical subscriber network scheme.

3. A communication unit according to claim 2, wherein: the second terminator comprises
a first interface which is arranged between the communication unit and the first terminal and which performs a first interface process conforming to a passive optical subscriber network scheme,
a second interface which performs a second interface process conforming to a Gigabit Ethernet scheme, and
a route switch which switches a route for a signal having been subjected to the second interface process in the second interface in accordance with a destination of the signal;
the switch sets the first setting so that a first signal path between the communication unit and the first terminal is connected to the second interface via the first interface and a second signal path between the communication unit and the second terminal is connected to the second interface via the first terminator; and
the switch sets the second setting so that the first signal path between the communication unit and the first terminal is connected to the first terminator via the first interface and the second signal path between the communication unit and the second terminal is connected to the first interface via the first terminator.

4. A communication unit according to claim 1, wherein:
the second terminator is configured to allocate different time slots to timing of transmission of signals from the first terminal and the second terminal; and
the communication unit further comprises, at an upstream position of the second terminator, a timing adjustor which adjusts timings of reception of signals transmitted from the first terminal and the second terminal when the switch sets the first setting.

5. An optical system comprising:
a first upper apparatus and a second upper apparatus that communicate with each other by an optical signal in a first optical transmission scheme;
a communication unit that is located downstream from the first upper apparatus and communicates with the first upper apparatus;
an another communication unit that is located downstream from the second upper apparatus and communicates with the second upper apparatus;
a first terminal that is located downstream from the communication unit; and
a second terminal that is located downstream from the another communication unit, wherein
the first terminal and the second terminal communicate with each other by an optical signal in a second optical transmission scheme through the communication unit, the first upper apparatus, the second upper apparatus, and the another communication unit, wherein
the communication unit and the another communication unit comprise:
a first terminator operable to terminate a communication channel in the first optical communication scheme between the communication unit and the another communication unit through the first upper apparatus and the second upper apparatus;
a second terminator operable to terminate the optical signal in the second optical communication scheme;
wherein the communication unit comprises a first setting section which sets a first setting so that a first optical signal in the second optical communication scheme between the communication unit and the first terminal is terminated by the second terminator and is formed into first packets, and a route for each of the first packets is switched in accordance with a destination of each of the first packets, and a second optical signal in the second optical communication scheme between the communication unit and the second terminal is terminated by the second terminator and is formed into second packets and a route for each of the second packets is switched in accordance with a destination of each of the second packets; and
wherein the another communication unit comprises a second setting section which sets a second signal path so that a third optical signal from the second terminal is output to the communication unit through the communication channel and a fourth optical signal from the first terminal through the communication channel is output to the second terminal.

6. A method for optical communication in an optical system including: a first upper apparatus and a second upper apparatus that communicate with each other by an optical signal in a first optical transmission scheme; a communication unit that is located downstream from the first upper apparatus and communicates with the first upper apparatus; an another communication unit that is located downstream from the second upper apparatus and communicates with the second upper apparatus; a first terminal that is located downstream from the communication unit; and a second terminal that is located downstream from the another communication unit, the first terminal and the second terminal communicate with each other by an optical signal in a second optical transmission scheme through the communication unit, the first upper apparatus, the second upper apparatus, and the another communication unit, the method comprising:
when the first terminal communicates with the second terminal,
setting a communication channel in the first optical communication scheme between the communication unit and the another communication unit;
by the communication unit,
terminating a first optical signal in the second optical communication scheme from the first terminal, forming the first optical signal into first packets, switching a route for each of the first packets in accordance with the destination of each of the first packets, and terminating a second optical signal in the second optical communication scheme from the second terminal connected through the communication channel set, forming the second optical signal into second packets and switching a route for each of the second packets in accordance with the destination of each of the second packets;
by the another communication unit,
outputting a third optical signal from the second terminal to the communication unit through the communication channel, and outputting a fourth optical signal, which is received from the first terminal through the communication channel set, to the second terminal.

7. A method for optical communication according to claim 6, further comprising:
by the first terminal,
notifying the communication unit of information about the second terminal that is to be the destination of the communication;
by the communication unit that has notified the information,
requesting a management unit that controls allocation of the communication channel to establish the communication channel between the communication unit and the another communication unit, and
by the management unit,
allocating the communication channel in response to the requesting.

8. A method for optical communication according to claim 6, further comprising:
by the second terminal,
notifying the another communication unit of information about the first terminal that is to be a communication destination;
by the another communication unit that has notified the information,
requesting a management unit that controls allocation of the communication channel to establish the communication channel between the another communication unit and the communication unit, and
by the management unit,
allocating the communication channel in response to the requesting.

9. A method for optical communication according to claim 7, further comprising
upon completion of the allocating of the communication channel by the management unit,
by the communication unit,
switching a route of the first packets according to the destination of each of the first packets and requesting the another communication unit to switch the route of the first packets according to the destination of each of the first packets.

10. A method for optical communication according to claim 8, further comprising
upon completion of the allocating of the communication channel by the management unit,
by the another communication unit,
switching a route of the third optical signal according to the destination of the third optical signal and requesting the communication unit to switch the route of the third optical signal according to the destination of the third optical signal.

* * * * *